Jan. 14, 1947.  D. F. COLE ET AL  2,414,093
MOLD COATING COMPOSITION AND METHOD OF
PROTECTING PLASTICS DURING MOLDING
Filed May 19, 1944

Inventors
Donald F. Cole
James F. Wynn

By
Attorneys

Patented Jan. 14, 1947

2,414,093

UNITED STATES PATENT OFFICE 2,414,093

MOLD COATING COMPOSITION AND METHOD OF PROTECTING PLASTICS DURING MOLDING

Donald F. Cole, United States Army, and James F. Wynn, United States Army, Fort Benjamin Harrison, Ind.

Application May 19, 1944, Serial No. 536,262

5 Claims. (Cl. 18—47)

(Granted under the act of March 3, 1883, as amended April 30, 1928; 370 O. G. 757)

The invention described herein may be manufactured and used by or for the Government for governmental purposes, without payment to us of any royalty thereon.

This invention relates to a method of molding dentures or other prosthetic appliances and more particularly to coating compositions containing alcohol-soluble prolamines and methods of applying films formed therefrom to the surfaces of the cavity in a denture mold.

Dentures formed of synthetic resins, cellulose derivatives or hard rubber materials such as vulcanite, have usually been prepared by casting, from an impression of the jaw, a stone or plaster model upon which is formed a wax pattern of the denture and the artificial teeth inserted therein. This is then invested in plaster of Paris or other standard investing materials and the wax melted out, thus forming a mold cavity which is adapted to receive the synthetic resin, cellulose derivative or hard rubber molding compositions. The molds used for this purpose are usually seperable into two parts, one-half being the investment with the teeth therein and the other the model upon which the wax pattern was formed. The respective parts of the mold are surrounded by metal containers which form the upper and lower halves of a flask. The upper flask containing the investment with the teeth supported therein is filled with the denture molding composition and the lower flask clamped in position thereon. The flasks are then subjected to the action of heat and pressure to case the denture in the mold cavity.

In forming dentures from synthetic resin or cellulose derivative molding compositions by the above molding process, it has been found necessary to employ a special technique, particularly in the case of partially or completely polymerized thermoplastic resins, partially condensed or uncondensed thermosetting resins or mixtures of the foregoing. The investment materials commonly used in preparing denture molds set to form a porous mass with the result that steam and moisture pass therethrough into the mold cavity. The presence of steam or moisture in the mold cavity interferes with the transformation of either synthetic resin or cellulose derivative molding compositions into a finished denture and also causes these materials to blush or become discolored. Another disadvantage is that many synthetic resins, when either polymerized or condensed in a mold cavity in direct contact with the usual investment materials, are seriously affected by the investment material and finished products of low quality are obtained. Thus, the water resistance of acrylic acid or methylacrylic acid resins and polymers of esters of methylacrylic acid may be reduced either by polymerizing intermediates of these resins or by molding the completely polymerized resin in direct contact with the investment material. Also, the condensation of thermosetting resins in the presence of either an acid or an alkaline catalyst may be either accelerated or inhibited by the investment material to such an extent that the condensation reaction is difficult to control. Furthermore, the surfaces of the mold cavity often contain flaws or imperfections which are reproduced by the molding composition in the finished product and must be carefully removed from the denture after it is withdrawn from the mold. Finally, resins often adhere to the plaster of Paris investment materials while being formed with the result that the finished dentures must be discarded.

The common technique for overcoming the foregoing objections has been to apply tin foil to the wax pattern and plaster model and invest the foiled pattern in the mold flasks. The flasks have then been separated and the wax melted out, thus forming a mold cavity having a foil coated surface. The tin foil surface serves as an effective steam and moisture tight barrier and also provides an inert surface upon which synthetic resins may be polymerized or condensed without being affected by the investment material. Numerous methods have been utilized for applying and adapting metal foils to wax patterns, but among these methods none is entirely satisfactory. The application of foil by hand requires a high degree of skill on the part of the operator and is an expensive and time consuming process. A great amount of foil breakage occurs in adapting the foil to a wax pattern by hand methods. Furthermore, there is danger of moving the embedded parts or of altering the wax pattern in applying metal foils by this method. Some mechanical devices have been designed for the specific purpose of applying and adapting metal foils to wax patterns, and while these mechanical expedients are an improvement over the hand methods, they have failed to overcome completely the foregoing problems.

This invention eliminates the necessity of using metal foils in the above molding processes and provides a simple, inexpensive and rapid method of preparing mold cavities in investment materials for the processing of synthetic resin and cellulose derivative molding compositions therein to produce dentures. This invention is accomplished in brief, by applying to the surface of a mold cavity a film containing as its principal ingredient an alcohol-soluble prolamine such as zein, the alcohol soluble protein of corn (maize) gluten. These films are tough, impervious to moisture and prevent steam and moisture from coming into contact with the denture molding material in the mold cavity. They are, furthermore, inert and provide an ideal base upon which synthetic resin or cellulose derivative molding compositions may be processed without being affected by the investment material.

This invention has for its principal object a method of molding dentures from synthetic resin, cellulose derivative or vulcanite molding compositions in molds, the surfaces of the cavities of which are coated with tough, water impervious materials which provide an inert base upon which the molding composition may be polymerized, condensed, vulcanized or otherwise processed without being affected by the investment material.

Another object of this invention is to provide a coating composition which is adapted to form a film on the surfaces of the mold cavity in a denture mold and provide an inert base upon which synthetic resin, cellulose derivative or vulcanite molding compositions may be polymerized, condensed, vulcanized or otherwise processed without being affected by the mold investment material.

Still another object of this invention is to provide a method of forming a steam and moisture tight coating on the surface of a mold cavity in a denture mold and thus prevent steam and moisture from coming into contact with synthetic resin or cellulose derivative molding compositions in the mold cavity.

A further object of this invention is to provide a method of forming a tough, water impervious, inert coating of an alcohol-soluble prolamine on the surfaces of a mold cavity by applying a coating composition containing an alcohol-soluble prolamine to a wax pattern formed on one flask of a separable denture mold, investing the coated pattern to form the other flask, transferring the alcohol-soluble prolamine coating from the wax pattern to the surface of the cavity in the second flask and thereafter applying the coating composition to the case or model of the jaw in the first flask.

A still further object of this invention is to provide a simple, inexpensive and fast method of forming dentures from synthetic resin, cellulose derivative or vulcanite molding compositions which does not require the application of metal foils to wax patterns in preparing the mold.

Other objects will be apparent from the following description of the invention, and the accompanying drawing in which.

Figure 1:
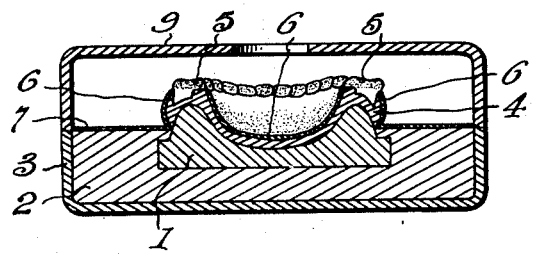
Figure 1 is a side elevational view in cross section of a flask showing the waxed-up case with the artificial teeth inserted therein coated with a protective film.
Figure 2:
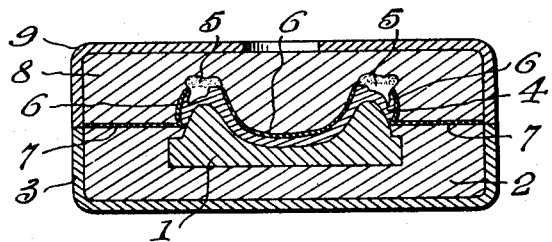
Figure 2 is a view similar to Figure 1, showing the investment material in the upper flask.
Figure 2:
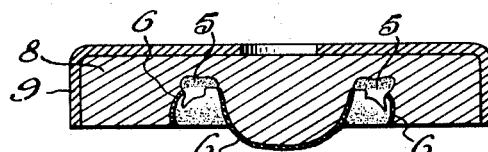
Figure 3:
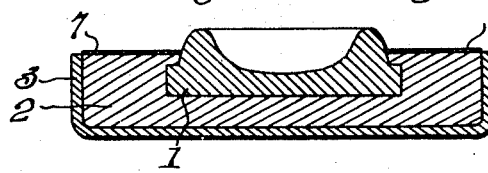
Figure 3 is a side elevational view in cross section of a sectional flask with sections thereof separated showing the protective film transferred to the investment material in the upper flask after removal of the wax pattern.
Figure 4:
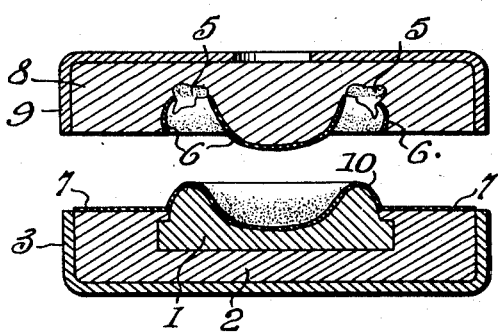
Figure 4 is a view similar to Figure 3, showing the case in the lower flask coated with a protective film.

In practicing this invention, a stone or plaster model of the jaw or case 1 is set in the investment material 2 in the lower flask 3 of a denture mold. A wax pattern 4 of the denture is then formed on the case 1 and the artificial teeth 5 inserted therein. A coating composition comprising a solution of an alcohol-soluble prolamine such as the alcohol-soluble protein of corn (maize) gluten is applied to the waxed-up case and the investing material to the edge of the lower flask either by painting or spraying. One or two coats of the coating composition are applied in the first half of the flasking procedure and then allowed to dry for a period of from five to ten minutes. After the coating has hardened to form a film 6 on the wax pattern 4 and a film 7 on the investment material 2 in the lower flask 3, the investment material 8 is poured in the upper flask 9 and allowed to set. The upper and lower flasks are then separated in the usual manner and the wax washed or flushed out with boiling water. The film 6, upon separation of the flasks, remains on the investment material 8 in the second or upper flask 9. When the case 1 in the investing material 2 in the lower flask 3 has been dried of excess water, one or two coats of the coating composition are applied and allowed to dry for a period of approximately ten minutes to form a protective film 10. The coating composition may be painted or sprayed on the case 1 either while the case is hot or after it has cooled. The entire surface of the mold cavity is thus lined with the protective film 6 and 10 and a separator 7 between the lower and upper flasks 3 and 9 formed by the coating applied to the investing material 2 during the first half of the flasking procedure. If, upon separating the flasks any tear or flaw in the coating is detected, the damaged area may be repaired by painting a thin coat directly on this area or if preferred, the entire mold may be coated.

The coating compositions employed in carrying out the invention comprise aqueous alcohol solutions of an alcohol-soluble prolamine. These proteins are commonly obtained by alcoholic extraction from the seeds of cereal grain and are designated zein from corn, gliadin from wheat and hordein from barley. They are characterized by insolubility in water but are soluble in relatively strong aqueous alcohols of from 50%–95% alcohol. While gliadin and hordein may be used, it is preferred to employ zein since its solutions dry quickly and form tough, hard, crack-free coatings without the aid of hardening agents. A wide variety of solvents, plasticizers and other modifying agents may be employed in preparing zein coating compositions as, for example, those disclosed in Patent No. 2,185,110 which issued December 26, 1939, to Roy E. Coleman. However, many of the common solvents and plasticizers for zein reduce the water resistance of the coatings formed therefrom and care must be exercised in the selection of these ingredients. The solvent mixtures employed in the compositions comprising this invention may include aqueous alcohol solvents such as ethyl alcohol, methyl alcohol and isopropyl alcohol, and hydrocarbon diluents such as benzene and toluene. It is preferred, however, to employ solvent mixtures of 95% aqueous ethyl alcohol and benzene. The preferred plasticizer is castor oil though other plasticizers which do not impair the water resistance of the coatings produced may be used such as dibutyl tartrate and esters of hydroxy acids. The coating compositions may also contain small quantities of phenol or triethanolamine as stabilizers. Small amounts of salicylic acid may also be incorporated in these compositions as a stabilizer and a toughening agent. Compositions which produce hard, tough, water resistant coatings are given below:

Examples

| | | |
|---|---|---|
| Zein | gm | 30 |
| Ethyl alcohol (95%) | cc | 80 |
| Benzene | cc | 20 |
| Castor oil | cc | 0.6 |
| Phenol | cc | 1.66 |
| Salicylic acid | cc | 0.25 |
| | | |
| Zein, roast at 300° 1 hr | gm | 11 |
| Methanol (absolute) | cc | 55 |
| Benzene | cc | 26 |
| Triethanolamine | cc | .6 |
| Castor oil C. P. | cc | 1 |
| Salicylic acid | gm | .3 |

The above coating compositions are free flowing and may be either painted or sprayed on the waxed-up cases.

The denture molds prepared by the method described above are especially suitable for forming dentures from synthetic resin, cellulose derivative or vulcanite molding compositions. Molding compositions of any of these materials may be placed in the mold cavity, the upper and lower flasks 9 and 3 joined and heat and pressure applied to polymerize, condense, cure or vulcanize the molding composition. The compositions do not adhere to the surface of the mold cavity nor are they otherwise affected by the investment material. The finished denture may be removed from the mold and polished lightly to remove any of the zein film which may adhere to the surface of the denture. The dentures possess smooth, bright, unblemished surfaces which are free from blush and discoloration and require little, if any, finishing treatment. Among the synthetic resins which may be employed, the following have been found satisfactory; polymers of acrylic acid, methylacrylic acid or mixtures thereof, polymers of the methyl, ethyl, n-propyl, n-butyl or isobutyl esters of acrylic acid and methylacrylic acid or mixtures thereof and polymers of mixtures of the foregoing acids and esters thereof; polymers of vinyl chloride, vinyl acetate, high molecular weight copolymers of vinyl chloride and vinyl acetate (85%–88% vinyl chloride), polystyrene and vinylidene polymers; and phenol-formaldehyde, urea-formaldehyde, thiourea-formaldehyde and melamine resins. The foregoing resins may be used in any standard form as, for example, in the case of the thermoplastic resins, molding compositions containing completely polymerized resins may be placed in the denture mold cavity and heat and pressure applied to form the denture. Alternatively, solutions of monomers or of polymers in monomers may be placed in the mold cavity and polymerization of the resin then conducted in the mold cavity. In the case of thermosetting resins, either uncondensed resin forming materials or partially condensed thermosetting resins may be placed in the mold cavity with acid or alkaline condensation catalysts as required and the condensation reaction carried out to form hard finished dentures. Any of the foregoing resins or mixtures thereof may be processed in mold cavities prepared in accordance with this invention without being affected by the investment materials. Various water resistant cellulose derivative molding compositions may be processed in denture molds prepared by this invention such as, cellulose nitrate, cellulose acetate, ethyl cellulose, cellulose acetate butyrate and other esters, ethers or mixed esters of cellulose. These materials may be used either in the form of molding powders containing plasticizers, fillers and other modifying agents or as preformed molding blanks. The standard hard rubber molding compositions known commercially as Vulcanite may also be vulcanized in the mold cavities of these denture molds, though the problems in the preparation of vulcanite dentures are not as difficult as those encountered in the preparation of synthetic resin or cellulose derivative dentures. The denture molds prepared in accordance with this invention are furthermore suitable in forming dentures of molding compositions containing compatible mixtures of the above resins or of these resins and cellulose derivatives.

This invention has the advantages of providing denture molds which are inexpensive and which may be prepared rapidly by operators having no more than average skill. It completely eliminates the necessity for the use of metal foils in denture molds which are used for forming dentures of synthetic resins and cellulose derivatives, thereby effecting great savings in time, labor and scarce materials. The coating compositions employed in carrying out the invention are inexpensive and may be easily prepared and applied to form films on the surfaces of the mold cavities. Finally, the denture molds prepared in accordance with this invention are capable of producing dentures of exceptionally high quality which require little, if any, treatment after their removal from the mold.

Having thus described our invention, what we claim as new and wish to secure by Letters Patent is:

1. A method of preparing a mold for plastic prosthetic appliances in which synthetic resin and cellulose derivative molding compositions are protected during molding, which comprises making a pattern, coating the pattern with a solution of an alcohol-soluble prolamine, drying the solution to form a tough, water impervious film, investing the pattern in a body of investment material, setting the body of investment material thereby transferring the film from the pattern to the investment material, eliminating the pattern to form a mold cavity having coated and uncoated surfaces, coating the uncoated surface of the mold cavity with said solution and drying said solution to form a mold cavity completely lined with a tough, water impervious film.

2. A method of preparing a mold for plastic prosthetic appliances in which synthetic resin and cellulose derivative molding compositions are protected during molding, which comprises making a pattern, coating the pattern with an aqueous alcohol solution of zein and a plasticizer, drying the solution to form a tough, water impervious film, investing the pattern in a body of investment material, setting the body of investment material thereby transferring the film from the pattern to the investment material, eliminating the pattern to form a mold cavity having coated and uncoated surfaces, coating the uncoated surface of the mold cavity with said solution and drying said solution to form a mold cavity completely lined with a tough, water impervious film.

3. A method of preparing a mold for plastic prosthetic appliances in which synthetic resin and cellulose derivative molding compositions are protected during molding, which comprises making a pattern, coating the pattern with an aqueous alcohol solution of zein and castor oil, drying the solution to form a tough, water impervious film, investing the pattern in a body of investment material, setting the body of investment material thereby transferring the film from the pattern to the investment material, eliminating the pattern to form a mold cavity having coated and uncoated surfaces, coating the uncoated surface of the mold cavity with said solution and drying said solution to form a mold cavity completely lined with a tough, water impervious film.

4. A method of preparing a mold for plastic prosthetic appliances in which synthetic resin and cellulose derivative molding compositions are protected during molding, which comprises making a pattern, coating the pattern with an aqueous alcohol solution of zein, castor oil, phenol and salicylic acid, drying the solution to form a tough, water impervious film, investing the pattern in a body of investment material, setting the body of investment material thereby transferring the film from the pattern to the investment material, eliminating the pattern to form a mold cavity having coated and uncoated surfaces, coating the uncoated surface of the mold cavity with said solution and drying said solution to form a mold cavity completely lined with a tough, water impervious film.

5. A coating composition adapted to form tough, water impervious films on the surfaces of a mold cavity in a mold for plastic prosthetic appliances and protect synthetic resin and cellulose derivative molding compositions during molding, comprising a solution consisting of zein about 30 gm., castor oil about 0.6 cc., phenol about 0.66 cc., salicyclic acid about 0.25 cc., 95% aqueous ethyl alcohol about 80 cc. and benzene about 20 cc. said composition being characterized by the property of forming films on a wax pattern which are transferrable to a plaster investing material when said pattern is embedded in said investing material and the latter allowed to set.

DONALD F. COLE.
JAMES F. WYNN.